June 16, 1942.  F. B. LOMAX  2,286,746
EGG TREATING APPARATUS
Filed Aug. 10, 1939
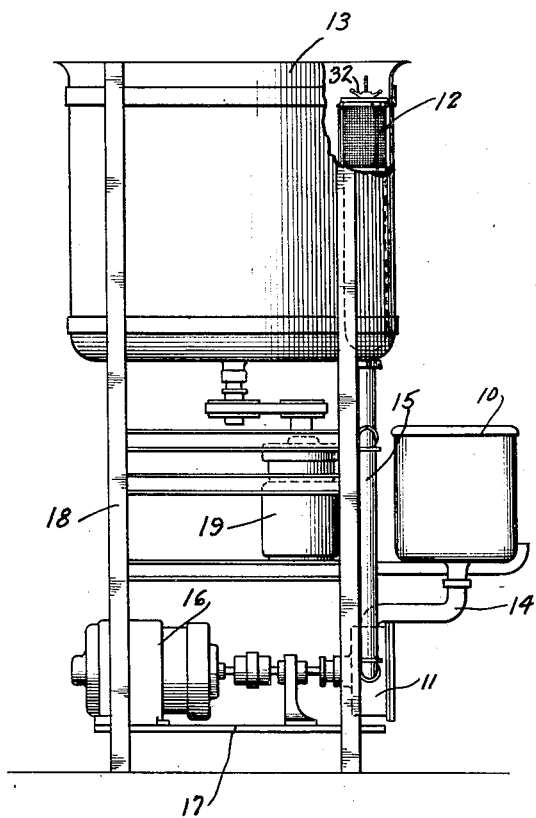
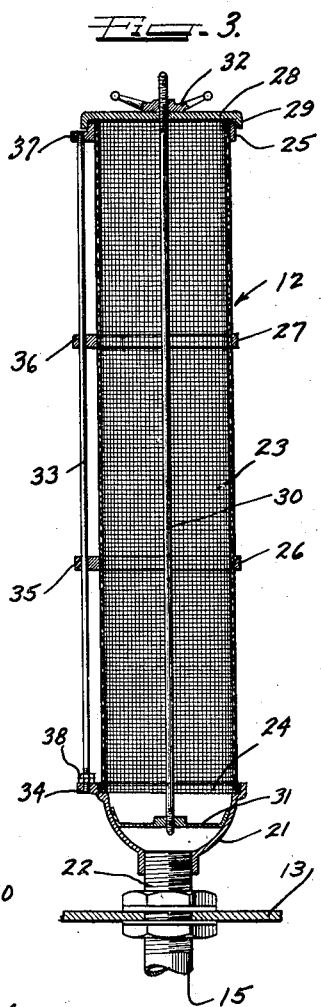
Inventor
FRANK B. LOMAX.
by Charles N. Hill Attys.

Patented June 16, 1942

2,286,746

UNITED STATES PATENT OFFICE 2,286,746

EGG TREATING APPARATUS

Frank B. Lomax, Chicago, Ill.

Application August 10, 1939, Serial No. 289,359

6 Claims. (Cl. 210—154)

This invention relates to an egg treating apparatus, and more particularly to an improved egg filtering apparatus of the same general character and for the same purpose as disclosed in U. S. Letters Patent No. 2,065,384 and No. 2,115,730, granted to W. L. Lomax.

An object of this invention is to provide a more compact and simplified form of egg treating and filtering apparatus of the same general type as that disclosed in said Letters Patent.

Another object of this invention is to provide an egg treating and filtering apparatus of such construction and arrangement that the filtering unit for removing chalazae, shell fragments, and foreign matter from the egg meats without causing foaming of the same may be disposed inside the container employed for mixing ensuing filtered mass into a homogeneous product.

Still another object of this invention is to employ the mixing tank of an egg treating apparatus of the foregoing type as a support and housing for a filtering unit for the egg material, and which unit may be quickly and easily removed for cleaning from the mixing tank or container.

In accordance with the general features of this invention, there is provided an apparatus for treating and filtering egg meats to remove foreign matter and chalazae therefrom, including a mixing container for receiving the egg material, a filter disposed in one side of a small portion of the space inside the container, and impelling means for forcing the egg material into the filter and laterally therethrough into the mixing container proper.

Another feature of the invention relates to the supporting of the filtering unit on the bottom of the mixing container in such a manner that the filter is removably connected to a support adjacent the bottom of the container whereby the filter may be removed upwardly from the mixing container and any material falling from the interior of the filter will gravitate into the support rather than into the bottom of the container.

Other objects and features of this invention will more fully appear from the following detailed description taken in connection with the accompanying drawing which illustrates a single embodiment thereof, and in which:

Figure 1 is a side view of an egg treating apparatus or machine embodying the features of this invention and partly broken away to show the location of the filtering unit in the container;

Figure 2 is a plan view of the structure shown in Figure 1; and

Figure 3 is an enlarged vertical section taken through the filtering unit to show the construction of the same and the manner in which it is attached to the cup-like support on the bottom of the mixing container.

As shown on the drawing:

The reference characters 10, 11, 12, and 13 designate respectively an egg receiving hopper, a gear pump for impelling under pressure the egg material being treated, a filter unit, and a mixing tank. These elements of my apparatus all broadly function in substantially the same way as the corresponding elements in the aforesaid patents for effecting a filtration and a mixing of egg meats into a homogeneous product. The process involved in the use of the elements is substantially the same as that involved in said patent, and therefore it will be appreciated that my present invention is not concerned with a changing of the steps involved in the process but rather in the provision of a more compact apparatus for carrying out the steps of the process.

The egg receiver 10, into which egg meats to be treated are dumped, is connected by a conduit 14 to the inlet side of the gear pump 11 which has its discharge side connected to a conduit 15, the upper end of which is in direct communication with the interior of the filtering unit 12.

The gear pump 11, which impels under pressure egg material from the receiver 10 up to and into the filter 12, is driven by a motor 16 mounted upon a platform 17 at the bottom of a frame designated generally by the reference numeral 18. This frame 18, as shown in Figure 1, comprises a plurality of angle irons to which is attached the mixing tank 13. Also, the frame 18 has mounted thereon a motor 19 for driving a mixing propeller 20 in the bottom of the tank or container 13, as shown in Figure 2.

My present invention is principally concerned with the location and arrangement of the filtering unit 12 with respect to the mixing container 13. I have found that by positioning this filtering unit 12 within the confines of the mixing container 13, I am enabled to not only produce a more compact structure but am also enabled to eliminate the necessity of providing a separate housing or closure for the filtering unit. That is to say, the confining wall of the tank 13 can by my present improvement be employed to serve as the enclosing housing for the material pumped through and out of the filtering unit 12.

The filtering unit 12 has at its lower end a cup-shaped support 21 which is threaded upon a small pipe connection 22 secured to the bottom of the container 13 and coupled to the upper end of the pipe 15, so that egg material can be pumped from the impelling device 11 directly into the bottom of the filtering unit 12.

Supported upon the cup-shaped support 21 is a cylindrical screen 23 which has brazed, soldered, or otherwise secured to its upper and lower extremities a pair of spaced reinforcing rings 24 and 25. Also brazed or otherwise secured to intermediate portions of the cylindrical vertical screen 23 is a pair of spaced reinforcing rings 26 and 27.

The upper end of the screen 23 is capped by a closure member 28 which includes a lateral flange 29 for embracing the collar or reinforcing ring 25. This cap 28 is, in turn, connected by means of a central rod 30 to a narrow flange 31, which spans a small portion of/inside of the cup 21 and has its ends fastened to the side wall of the cup 21. This rod 30 has its lowermost end threaded into the flange or strap 31 and has its upper end provided with a turn nut 32 by means of which the screen and its cap may be tightly clamped to the support 21.

In order to further rigidify the screen unit, there are provided a plurality of spaced vertical rods 33 which, as shown in Figure 2, may be three in number. Each of these rods extends through lugs 34, 35, 36, and 37 on the collars or rings 24, 26, 27, and 25 respectively. It will be noted that each of these reinforcing rods extends loosely through the lugs 35 and 36 and has its upper end threaded into the upper lug 37. The lower end of the rod may be loosely fitted into an aperture in the lug 34 and may also have threaded upon it lock nuts 38 which can be turned to spread the ends of the screen and to thus maintain the screen in a true and taut vertical position.

Removal of the screen 23 may be effected by removing the turn nut 32 and thereafter lifting the screen and its reinforcing rods 33 bodily off of the supporting cup 21 and out of cooperation with the central rod 30 which remains attached to the cup 21. In the course of removing this screen, it will be appreciated that any material on the inside of the screen which tends to gravitate downwardly therefrom will fall onto the cup 21 rather than directly onto the bottom of the container.

From the foregoing detailed description, it is apparent that this apparatus may be employed to practice the process of the previously noted Lomax patents. During this process, a filter bed of egg material including chalazae, fragments of shell, and other foreign matter is built up on the screen 23, and it is through this filter bed that the egg meats are forced by the pump 11 into the mixing container 13 where such filtered material is mixed into a homogeneous product. The pump 11, of course, impels the liquid material with a pressure in excess of atmospheric pressure, so that the resistance of the barrier on the screen 23 will be overcome to the extent of allowing predetermined quantities of egg material to be passed therethrough. It will, of course, be appreciated that after the apparatus has been in use for the treatment of a given amount of material, it is necessary to remove the screen 23 from the support and to clean the same. My invention facilitates this cleaning operation which may take place once or twice during a given day's use of the apparatus and furthermore eliminates the need of a separate housing for the screen 23.

It should also be noted that the filtering unit 12 is disposed alongside of a vertical wall of the tank 13 and occupies only a relatively small amount of the space inside of the tank 13, so that little resistance, if any, is offered to the proper mixing of the egg material discharged into the tank from the filter. In actual use of the apparatus, the tank is first filled with filtered material discharged into the tank through the filtering unit, and thereafter the operation of the pump 11 is arrested and the operation of the motor 19 is started to actuate the mixing propeller 20. In other words, the mixing operation is preferably performed subsequent to the filtering operation.

Also, as in the previously patented apparatus, the mixing container 13 may be provided with a discharge pipe and faucet 40 for enabling withdrawal of the contents of the tank after said contents have been homogeneously mixed together.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In an apparatus for treating and filtering egg meats to remove foreign matter and chalazae therefrom, a mixing container for receiving the egg material and in which said material is mixed, a filter disposed in one side of small portion of the space inside said container and adjacent a vertical wall of the container, said filter extending vertically alongside said wall, means for forcing egg material into said filter and laterally therethrough into the mixing container proper, and means in said container for whirling the egg material therein, said filter being in the path of the whirled fluid and thus interrupting the whirling fluid.

2. In an apparatus for treating and filtering egg meats to remove foreign matter and chalazae therefrom, a mixing container for receiving the egg material and in which said material is whirled, agitated, and mixed, a filter disposed in one side of small portion of the space inside said container and adjacent a vertical wall of the container, said filter extending vertically alongside said wall, and means for forcing egg material into said filter and laterally therethrough into the mixing container proper, said filter being cylindrical and extending vertically along a side of the wall of said container so as to interrupt the whirling egg material and thus to aid in its agitation.

3. In an apparatus for treating and filtering egg meats to remove foreign matter and chalazae therefrom, a mixing container for receiving the egg material and in which said material is mixed, a filter disposed in one side of small portion of the space inside said container and adjacent a vertical wall of the container, said filter extending vertically alongside said wall, and means for forcing egg material into said filter and laterally therethrough into the mixing container proper, said means comprising an impeller device for forcing said egg material by a pressure in excess of atmospheric pressure through said filter directly against egg material already in the container and for thus causing a filter bed of egg material to be built up on the filter and through which subsequent material impelled by said means is forced.

4. In an apparatus for treating egg material to remove foreign material therefrom, comprising a container, a tubular filter extending vertically and being disposed alongside and adjacent an inner surface of a vertical wall of said container, an inlet egg material carrying conduit in direct communication with the interior of said filter, and an egg material carrying conduit in communication with said container independent of said conduit connected to said filter, said filter being removable vertically from said container without disconnecting said conduits from said container.

5. In an apparatus for treating egg material to remove foreign material and chalazae therefrom, comprising a container, a tubular filter extending vertically and being disposed alongside and adjacent an inner surface of a vertical wall of said container, an egg material carrying conduit in direct communication with the interior of said filter, and an egg material carrying conduit in communication with said container independent of said conduit connected to said filter, said first conduit including a support cup for and to which said filter is removably connected adjacent the bottom of said container whereby said filter may be removed upwardly from said conduit and any material falling from the interior of said filter will gravitate into said cup instead of onto the bottom of said container.

6. In an apparatus for treating egg material to remove foreign material and chalazae therefrom, comprising a container, a tubular filter extending vertically and being disposed alongside and adjacent an inner surface of a vertical wall of said container, an egg material carrying conduit in direct communication with the interior of said filter, an egg material carrying conduit in communication with said container independent of said conduit connected to said filter, said first conduit including a support cup for and to which said filter is removably connected adjacent the bottom of said container whereby said filter may be removed upwardly from said conduit and any material falling from the interior of said filter will gravitate into said cup instead of onto the bottom of said container, and means extending from the top of the filter and downwardly through the filter for detachably clamping the filter to said support.

FRANK B. LOMAX.